United States Patent Office 3,300,967
Patented Jan. 31, 1967

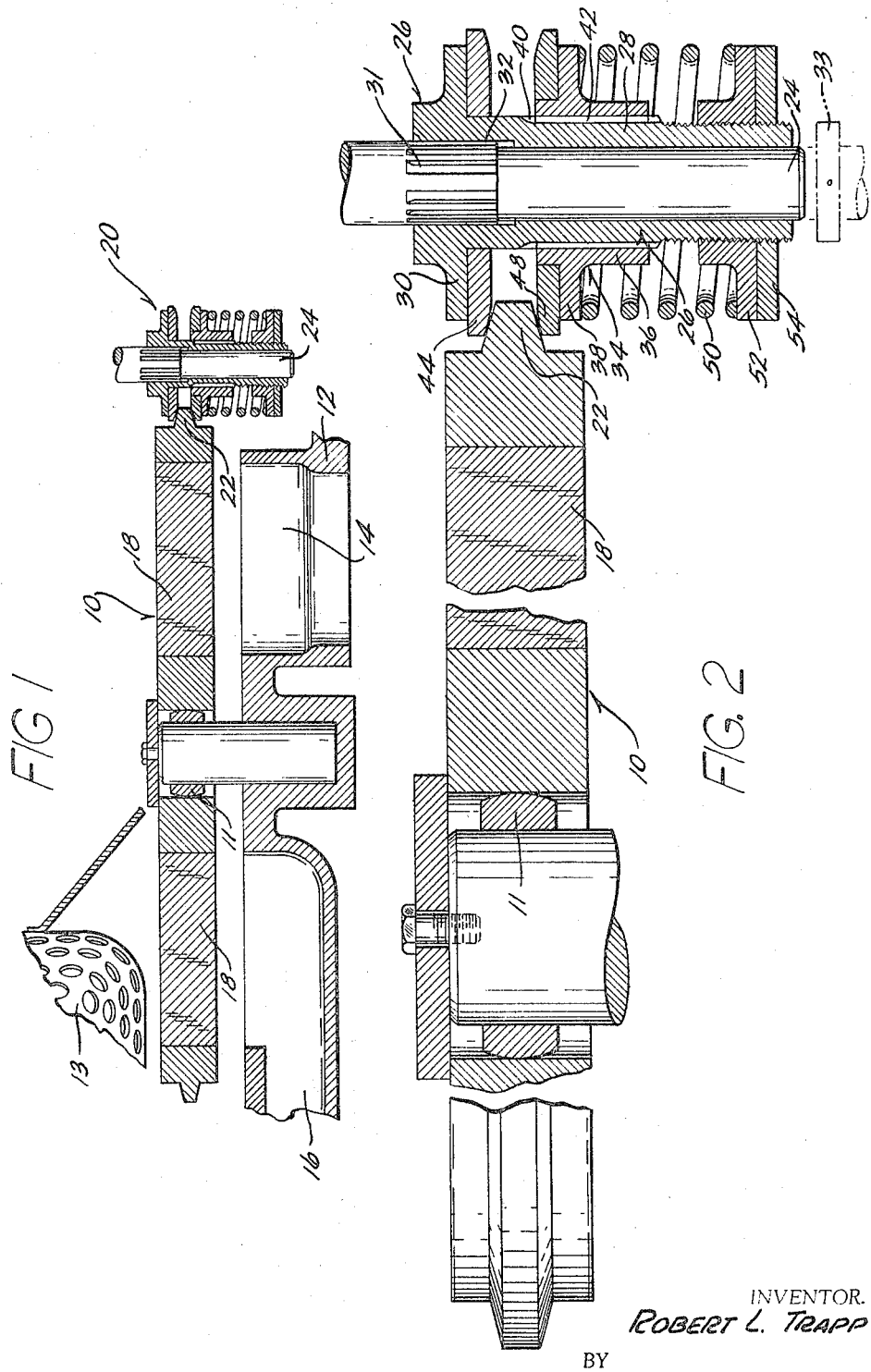

3,300,967
TRACTION DRIVE FOR CERAMIC REGENERATORS
Robert L. Trapp, Milwaukee, Wis., assignor to Outboard Marine Corporation, Waukegan, Ill., a corporation of Delaware
Filed July 2, 1965, Ser. No. 469,201
11 Claims. (Cl. 60—39.51)

This invention relates to gas turbine engines and, generally, to drives for rotary discs.

Because of the very low coefficient of expansion of ceramic material, such material is desirably employed in heat regenerators for gas turbine engines. Ceramic heat regenerators of the rotary disc-type are generally driven at the outer periphery thereof by conventional gear means. Use of conventional gear means requires the mounting of a gear in the form of a metal drive rim to the outer periphery of the ceramic rotary disc. Because of the great disparity in the coefficient of expansion of metal and ceramic, the mounting of such a metal drive rim to the ceramic disc is difficult and impractical. Though this invention is particularly applicable to ceramic regenerators, it is not intended to be limited to regenerators only and can be used with any rotary disc.

An important object of this invention is to provide a drive for a rotary disc-type heat regenerator which drives the rotary disc at the outer periphery thereof without employing conventional gear means and which is free floating to prevent the application of side loads on the driven disc.

In the disclosed construction, the drive, referred to as a traction drive, includes a pair of members having respective flanges which are adapted to drivingly engage or resiliently pinch the outer periphery or rim of a ceramic rotary disc-type regenerator. One member is axially slidably carried on a driving shaft which is suitably connected to one of the stages of a gas turbine engine but can be driven by any suitable source. The other member is axially slidably carried on the one member and is biased by suitable means towards the one member, whereby the respective flanges of the members can drivingly engage the rim or outer periphery of the rotary disc.

Other objects and advantages will become apparent from the following description and accompanying drawings in which:

FIGURE 1 is an elevational view, with parts broken away and in section, of a portion of a gas turbine engine and showing a rotary disc-type regenerator as driven by the traction drive of the invention; and FIGURE 2 is an enlarged view of a portion of the turbine engine shown in FIGURE 1 and embodying various of the features of the invention.

Referring to the drawings, a ceramic rotary disc-type heat regenerator 10 is rotatably mounted by suitable means, including a partially spherical carbon bearing 11, to a cover or housing 12 of a gas turbine engine 13, fragmentarily shown in FIGURE 1. The regenerator 10 includes a matrix 18 located in closely adjacent relation to the exhaust and intake ports 14 and 16. The spherical bearing 11 affords the rotary disc 10 a limited amount of angular movement relative to a plane normal to the axis of the bearing 11. Rotation of the rotary disc 10 affords a continuous heating of the matrix 18 by the turbine engine exhaust flowing from the engine toward the exhaust port 14. The intake air for the gas turbine engine is heated by passing through heated matrix 18.

The drive or traction drive 20 of the present invention drives the ceramic disc 10 at the outer periphery or rim 22 thereof. The traction drive 20 includes a driving shaft 24 rotatably carried by the housing 12. The driving shaft 24 is driven from one of the stages of the gas turbine engine 13. The shaft 24 carries a first or carrier member 26 having a hub 28 and having means in the form of a flange 30 radially extending from the hub 28 for engaging one side of the rim 22 of the rotary disc 10. Means are provided for mounting the carrier member 26 on the shaft 24 for rotation with and for limited axial movement relative to the shaft 24. In the disclosed construction, such means comprises a splined portion 31 on the shaft 24 complementarily engaged with an internal splined portion 32 in the carrier hub 28. The carrier member 26 is axially movable on shaft 24 in one direction until the complementary splines 31 and 32 lock with each other. The arrangement of the drive 20 is such that it centers itself with the rim 22 of the regenerator 10, and, as a result, the drive does not require limit stops in either direction. However, if desired, a locking collar arrangement 33 (shown in phantom lines in FIGURE 2) can be provided to limit movement of the carrier member 26 in the other direction.

The carrier member 26 carries a second member or slide 34 having a hub 36 and means in the form of a flange 38 radially extending from the hub 36 for engaging the other side of the rim 22 of the rotary disc 10. Means are provided for mounting the slide member 34 on the carrier member 26 for rotation with and for limited axial movement relative to the carrier member 26. In the disclosed construction, such means comprises an externally splined portion 40 on the carrier hub 28 complementarily engaged with an internal splined portion 42 in the slide hub 36.

Hardened drive washers 44 and 48 are fixed to the rim engaging sides of the flanges 30 and 38 to provide wear faces for frictionally engaging the outer periphery of the rim 22.

Means are provided for affording driving engagement of the flanges 30 and 38 with the outer periphery or rim 22. In the preferred embodiment, such means comprises a coil spring 50 connected between the carrier and slide members 26 and 34. Specifically, a portion of the spring 50 encircles the slide hub 36 and has one end abutting the back side of flange 38. The other end of the spring 50 abuts a spring stop 52 which is adjustably threadedly received on one end of the carrier hub 28 and which can be locked in a given position on the carrier hub 28 by means of a lock nut 54. The spring 50 is in a compressed condition between the members 26 and 34 and exerts a spring force in a direction which biases the slide member 34 towards the carrier member 26 whereby the flanges 30 and 38 are caused to pinch or clamp the rim 22 therebetween with sufficient force to afford frictional driving engagement of the hardened drive washers 44 and 48 with the rim 22. Of course, the spring stop 52 can be adjusted to any position to provide an increased or decreased pinching force between the flanges 30 and 38.

The carrier member 26 and the slide member 34 are free floating or axially movable relative to the driving shaft 24. Accordingly, this floating action prevents side loads on the rim 22 to disc wabble or other causes which can be asociated with the heated condition of the turbine engine when operating.

Various of the features of the invention are set forth in the following claims.

What is claimed is:
1. A drive for a rotary disc-type heat regenerator used with a gas turbine engine, said drive comprising a shaft, a first member having means for engaging the outer periphery of the rotary disc-type regenerator, means mounting said first member on said shaft for rotation with and for axial movement relative to said shaft, a second member having means for engaging the outer periphery of the rotary disc-type regenerator, means mounting said second member on said first member for rotation with and for axial movement relative to said first member, and means for affording driving engagement of said engaging means with the outer periphery of the rotary disc-type regenerator.

2. A drive for a rotary disc-type heat regenerator used with a gas turbine engine, said drive comprising a shaft having a splined portion, a first member including a flange, an internally splined portion slidably engaged with said shaft splined portion and an externally splined portion, a second member having a flange and an internally splined portion slidably engaged with said externally splined portion of said first member, and means for affording driving enegagement of said flanges with the outer periphery of the rotary disc-type regenerator.

3. A traction drive for driving a rotary disc-type heat regenerator used with a gas turbine engine, said drive comprising a drive shaft having a splined portion, a first member slidably carried on said shaft and including a radially extending flange, an internally splined portion engageable with said shaft splined portion and an externally splined portion proximate said flange, a second member slidably carried on said first member and including a radially extending flange and an internally splined portion engageable with said externally splined portion of said first member, and a spring connected between said first and second members for biasing said second member towards said first member whereby said flanges of said first and second members can drivingly engage the outer periphery of the rotary disc-type regenerator and whereby said traction drive can move in either direction along the axis of said driving shaft to prevent side loads on the rotary disc-type heat regenerator.

4. The device as set forth in claim 3 wherein said flanges of said first and second member respectively carry hardened drive washers providing faces for frictionally engaging the outer periphery of the rotary disc-type regenerator.

5. The device as set forth in claim 3 including an adjustable spring stop threadedly received on one end of said first member and a locking nut also threadedly received on said one end for locking said spring stop in a given position, the ends of said spring being disposed to respectively engage said flange of said second member and said spring stop to provide a spring force biasing said second member towards said first member.

6. A traction drive for driving a rotary disc-type heat regenerator used in a gas turbine engine, said drive comprising a drive shaft having a splined portion, a first member slidably carried on said shaft and including a radially extending flange, an internally splined portion engageable with said shaft splined portion and an externally splined portion proximate said flange, a second member slidably carried on said first member and including a radially extending flange and an internally splined portion engageable with said externally splined portion of said first member, hardened drive washers respectively carried by said flanges of said first and second members for frictionally engaging the outer periphery of the rotary disc-type regenerators, a spring stop threadedly received on one end of said first member, a locking nut also threadedly received on said one end for locking said spring stop in a given position, and a coil spring having ends disposed to respectively engage said flange of said second member and said spring stop to provide a spring force biasing said second member towards said first member whereby said hardened drive washers of said respective flanges can drivingly engage the rim or outer periphery of the rotary disc.

7. In a gas turbine engine, the combination of a housing, a rotary disc-type heat regenerator rotatably mounted on said housing, a driving shaft rotatably mounted on said housing and drivenly connected to said turbine engine, a first member having means for engaging the outer periphery of said rotary disc-type regenerator, means mounting said first member on said shaft for rotation with and for limited axial movement relative to said shaft, a second member having means for engaging the outer periphery of said rotary disc, means mounting said second member on said first member for rotation with and for limited axial movement relative to said first member, and means for affording driving engagement of said engaging means with the outer periphery of said rotary disc.

8. In a gas turbine engine, the combination of a housing, a rotary disc-type heat regenerator rotatably mounted on said housing by means including a partially spherical bearing, a driving shaft rotatably mounted on said housing and drivenly connected to said turbine engine, a carrier member slidably carried on said shaft and including a radially extending flange, an internally splined portion engaged with said shaft splined portion and an externally splined portion proximate said flange, a slider member slidably carried on said carrier member and including a radially extending flange and an internally splined portion engaged with said externally splined portion of said carrier member, hardened drive washers carried by said flanges of said carrier and slider members for frictionally engaging the outer periphery of the rotary disc-type regenerator, a spring stop threadedly received on one end of said carrier member, a locking nut also threadedly received on said one end for locking said spring stop and a given position, and a coil spring having ends disposed to respectively engage said flange of said slider member and said spring stop to provide a spring force biasing said slider member towards said carrier member whereby said hardened drive washers of said respective flanges can drivingly engage the rim or outer periphery of the rotary disc.

9. The invention as set forth in claim 8 including a collar carried on said shaft for limiting axial movement of said carrier member in one direction and whereby said engaged splines of said carrier member and said shaft can lock with each other to limit axial movement of said carrier in the other direction.

10. A drive for a rotary disc, said drive comprising a shaft, a first member having means for engaging the outer periphery of the rotary disc, means mounting said first member on said shaft for rotation with and for axial movement relative to said shaft, a second member having means for engaging the outer periphery of the rotary disc, means mounting said second member on said first member for rotation with and for axial movement relative to said first member, and means for affording driving engagement of said engaging means with the outer periphery of the rotary disc.

11. The combination of a rotary disc, means supporting said disc for rotation, a shaft, means supporting said shaft for rotation, a first member having means for engaging the outer periphery of said disc, means mounting said first member on said shaft for rotation with and for axial movement relative to said shaft, a second member having means for engaging the outer periphery of said disc, means mounting said second member on said first member for rotation with and for axial movement relative to said first member, and means for biasing said second member toward said first member to afford driving engagement of said engaging means with the outer periphery of said disc.

References Cited by the Examiner

UNITED STATES PATENTS 2,674,898  4/1954  Mudersbach _____ 165—8 X

FOREIGN PATENTS 261,476  11/1926  Great Britain.

MARK NEWMAN, *Primary Examiner.*

RALPH D. BLAKESLEE, *Examiner.*